(12) United States Patent
Wu et al.

(10) Patent No.: US 9,900,040 B2
(45) Date of Patent: Feb. 20, 2018

(54) WIRELESS COMMUNICATION APPARATUS

(71) Applicant: PEGATRON CORPORATION, Taipei (TW)

(72) Inventors: Chien-Yi Wu, Taipei (TW); Chao-Hsu Wu, Taipei (TW); Yu-Yao Chang, Taipei (TW); Cheng-Hsiung Wu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 15/196,053

(22) Filed: Jun. 29, 2016

(65) Prior Publication Data

US 2017/0018838 A1    Jan. 19, 2017

(30) Foreign Application Priority Data

Jul. 16, 2015    (TW) .............................. 104123111 A (51) Int. Cl.

| | |
|---|---|
| *H01Q 1/48* | (2006.01) |
| *H04B 1/3827* | (2015.01) |
| *H01Q 1/27* | (2006.01) |
| *H01Q 1/38* | (2006.01) |
| *H01Q 9/42* | (2006.01) |

(52) U.S. Cl.
CPC ............. *H04B 1/385* (2013.01); *H01Q 1/273* (2013.01); *H01Q 1/38* (2013.01); *H01Q 1/48* (2013.01); *H01Q 9/42* (2013.01)

(58) Field of Classification Search
CPC ............. H01Q 1/243; H01Q 1/48; H01Q 1/50
USPC ......................................................... 343/702
See application file for complete search history.

(56) References Cited

U.S. PATENT DOCUMENTS

| | | | | |
|---|---|---|---|---|
| 2013/0154886 | A1* | 6/2013 | Isohatala ................ | H01Q 1/243 343/702 |
| 2013/0181873 | A1* | 7/2013 | Gutschenritter ....... | H01Q 1/273 343/718 |

FOREIGN PATENT DOCUMENTS

| | | |
|---|---|---|
| CN | 102709672 B | 12/2014 |
| TW | M339094 U | 8/2008 |

* cited by examiner

*Primary Examiner* — Andrea Lindgren Baltzell
(74) *Attorney, Agent, or Firm* — CKC & Partners Co., Ltd.

(57) ABSTRACT

A wireless communication apparatus includes a base, a sidewall, a top cap, a main ground structure, an antenna and a parasitic ground structure. The base has a top surface. The sidewall is disposed on the base. The sidewall has an inner wall surface. The inner wall surface stands on the top surface of the base. The top cap caps the sidewall. The top cap has a lower surface facing toward the top surface of the base. The main ground structure is disposed on the top surface and surrounded by the sidewall. The antenna is disposed on the inner wall surface. The parasitic ground structure is disposed on the lower surface of the top cap and electrically connected to the main ground structure. The parasitic ground structure and the main ground structure are cooperatively configured to resonate with the antenna.

13 Claims, 5 Drawing Sheets

WIRELESS COMMUNICATION APPARATUS

RELATED APPLICATIONS

This application claims priority to Taiwan Application Serial Number 104123111 filed Jul. 16, 2015, which is herein incorporated by reference.

BACKGROUND

Technical Field

The present disclosure relates to a wireless communication apparatus.

Description of Related Art

In pace with development of the wireless communication technique, the wearable wireless communication apparatus becomes a focus in this technical field. Generally, the wearable wireless communication apparatus includes plural antennas that individually achieve the GPS function, the Bluetooth® transmission function and the GSM transmission function.

In order to benefit the user to comfortably wear the wearable wireless communication apparatus, a size of the wearable wireless communication apparatus cannot be unduly large. However, if the wearable wireless communication apparatus is scaled down, the ground surface may be unduly small, which may cause a poor low frequency bandwidth of the resonant mode of the GSM antenna. In particular, if the wearable wireless communication apparatus is scaled down, the low frequency band of the resonant mode of the GSM antenna is not wide enough to cover the GSM 850 band.

SUMMARY

The present disclosure improves a bandwidth of a low-frequency resonant band of a small-sized wireless communication apparatus.

In accordance with one embodiment of the present disclosure, a wireless communication apparatus includes a base, a sidewall, a top cap, a main ground structure, an antenna and a parasitic ground structure. The base has a top surface. The sidewall is disposed on the base. The sidewall has an inner wall surface. The inner wall surface stands on the top surface of the base. The top cap caps the sidewall. The top cap has a lower surface facing toward the top surface of the base. The main ground structure is disposed on the top surface and surrounded by the sidewall. The antenna is disposed on the inner wall surface. The parasitic ground structure is disposed on the lower surface of the top cap and electrically connected to the main ground structure. The parasitic ground structure and the main ground structure are cooperatively configured to resonate with the antenna.

In accordance with another embodiment of the present disclosure, a wireless communication apparatus includes a base, a sidewall, a top cap, a main ground structure, a parasitic ground structure and an antenna. The base has a top surface. The sidewall is disposed on the base. The sidewall has an inner wall surface. The top cap caps the sidewall. The top cap has a lower surface facing toward the top surface. The main ground structure is disposed on the top surface of the base and surrounded by the sidewall. The parasitic ground structure is disposed on the inner wall surface of the sidewall and electrically connected to the main ground structure. The antenna is disposed on the lower surface of the top cap. The parasitic ground structure and the main ground structure are cooperatively configured to resonate with the antenna.

In the foregoing embodiments, the wireless communication apparatus not only employs the top surface of the base to place the main ground structure thereon, but also employs the lower surface of the top cap or the inner wall surface of the sidewall to place the parasitic ground structure thereon. Therefore, the ground area in a limited space can be increased, so that the ground structures and the antenna can resonate to generate a low-frequency resonant band that is low enough to satisfy a particular communication requirement, such as covering the GSM 850 band.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
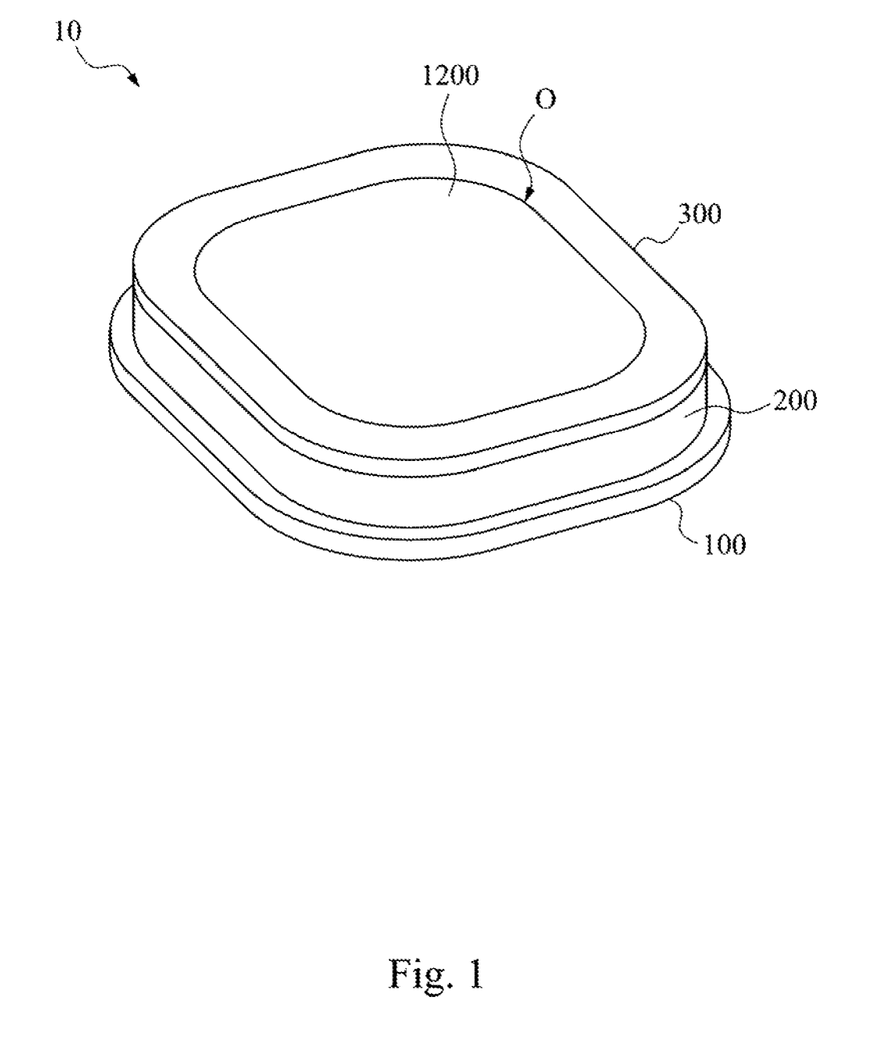
FIG. 1 is a perspective view of a wireless communication apparatus in accordance with one embodiment of the present disclosure.
Figure 2:
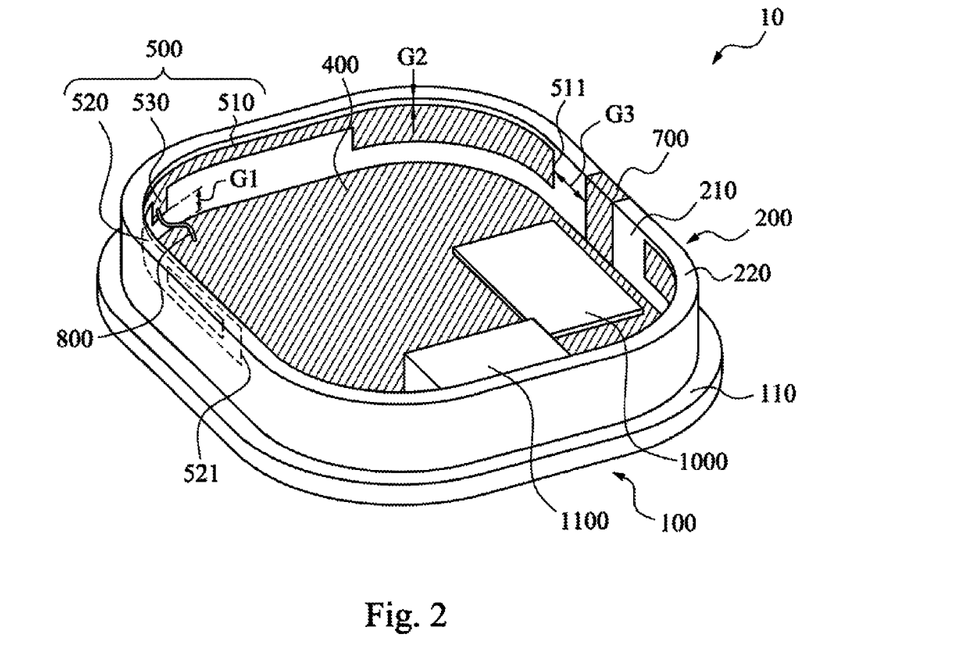
FIG. 2 is a perspective view of an interior of the wireless communication apparatus shown in FIG. 1.

FIG. 1 is a perspective view of a wireless communication apparatus in accordance with one embodiment of the present disclosure. As shown in FIG. 1, the wireless communication apparatus 10 includes a base 100, a sidewall 200 and a top cap 300. The sidewall 200 is disposed on the base 100 in an enclosing manner. The top cap 300 caps the sidewall 200. FIG. 2 is a perspective view of an interior of the wireless communication apparatus 10 shown in FIG. 1. As shown in FIG. 2, the base 100 has a top surface 110. The sidewall 200 is disposed on the top surface 110 of the base 100 in an enclosing manner. The sidewall 200 has an inner wall surface 210. The inner wall surface 210 stands on the top surface 110 of the base 100. The wireless communication apparatus 10 includes a main ground structure 400 and an antenna 500. The antenna 500 is disposed on the inner wall surface 210 of the sidewall 200. The main ground structure 400 is disposed on the top surface 110 of the base 100. The main ground structure 400 is surrounded by the sidewall 200. In particular, the inner wall surface 210 surrounds the main ground structure 400 on the base 100. Therefore, a size of the main ground structure 400 is determined based on the area of the top surface 110 of the base 100 surrounded by the inner wall surface 210. If the wireless communication apparatus 10 is scaled down, the area of the top surface 110 is reduced, which may cause the main ground structure 400 failing to provide a large enough ground area, so that a low-frequency resonant band generated by resonance of the main ground structure 400 and the antenna 500 may be not low enough.

Figure 3:
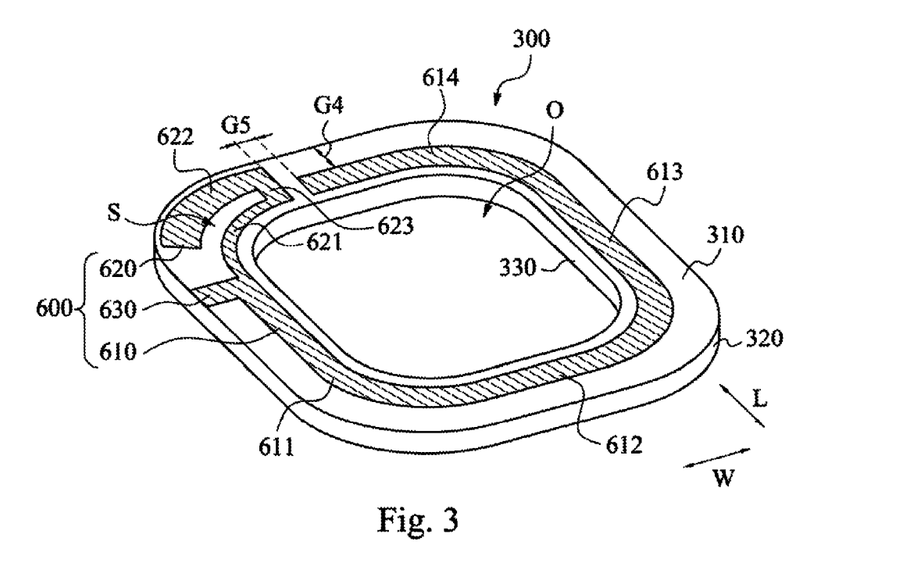
FIG. 3 is a perspective view of the top cap.

As a result, another region of the wireless communication apparatus 10 is employed to increase the ground area. In particular, Reference can be made to FIG. 3, which is a perspective view of the top cap 300. As shown in FIG. 3, the wireless communication apparatus 10 further includes a parasitic ground structure 600. The top cap 300 has a lower surface 310. When the top cap 300 caps the sidewall 200 (See FIG. 2), the lower surface 310 faces toward the top surface 110 of the base 100 (See FIG. 2). The parasitic ground structure 600 is disposed on the lower surface 310 of the top cap 300. The parasitic ground structure 600 is electrically connected to the main ground structure 400 on the base 100. The parasitic ground structure 600 and the main ground structure 400 are cooperatively configured to resonate with the antenna 500. Therefore, the parasitic ground structure 600 can provide additional ground area, so that the ground structures 400 and 600 and the antenna 500 can resonate to generate a low-frequency resonant band that is low enough to satisfy a particular communication requirement, such as covering the GSM 850 band.

In some embodiments, as shown in FIG. 2, the antenna 500 includes a first radiating portion 510, a second radiating portion 520 and a signal feeding portion 530. The signal feeding portion 530 is connected between the first radiating portion 510 and the second radiating portion 520. The first radiating portion 510 and the second radiating portion 520 have different shapes and sizes, so that the electrical lengths of the first radiating portion 510 and the second radiating portion 520 are unequal. In particular, the first radiating portion 510 has a first end 511. The first end 511 is located on a location of the first radiating portion 510, and the electrical length between this location and the signal feeding portion 530 is longest in the first radiating portion 510. The second radiating portion 520 has a second end 521. The second end 521 is located on a location of the second radiating portion 520, and the electrical length between this location and the signal feeding portion 530 is longest in the second radiating portion 520. An electrical path defined from the signal feeding portion 530 to the first end 511 is longer than an electrical path defined from the signal feeding portion 530 to the second end 521, so that the electrical length of the first radiating portion 510 is greater than the electrical length of the second radiating portion 520.

When the wireless communication apparatus transmits RF signals, the RF signals can be fed to the antenna 500 via the signal feeding portion 530 and can be transmitted toward the first end 511 of the first radiating portion 510 and the second end 521 of the second radiating portion 520, respectively. During this signals transmission period, the main ground structure 400 and the parasitic ground structure 600 can generate a first resonant mode with the first radiating portion 510 in a manner of capacitive coupling, and the main ground structure 400 and the parasitic ground structure 600 can also generate a second resonant mode with the second radiating portion 520 in a manner of capacitive coupling. Since the electrical lengths of the first radiating portion 510 and the second radiating portion 520 are unequal, the first resonant mode and the second resonant mode can have different frequency bands, which may implement a multi-frequency antenna to satisfy communication requirements of different frequency bands. It is understood that this paragraph employs RE signals transmitting method to explain operation of the antenna. However, the RF signals receiving method is similar to the RF signals transmitting method, and therefore, it is not described repeatedly.

As shown in FIG. 2, the wireless communication apparatus 10 further includes a signal transmission wire 800. A positive terminal of the signal transmission wire 800 is connected to the signal feeding portion 530. A negative terminal of the signal transmission wire 800 is connected to the main ground structure 400, so that the parasitic ground structure 600 that is electrically connected to the main ground structure 400 can also be electrically connected to the negative terminal of the signal transmission wire 800 as well, so as to resonate with the antenna 500. In some embodiments, the signal transmission wire 800 can be, but is not limiting to, a coaxial transmission wire.

In some embodiments, as shown in FIGS. 2 and 3, the wireless communication apparatus 10 further includes a ground connecting structure 700. The ground connecting structure 700 is disposed on the sidewall 200, so as to connect the main ground structure 400 on the base 100 and the parasitic ground structure 600 on the top cap 300. In particular, the sidewall 200 further includes a top wall surface 220. The top wall surface 220 adjoins with the inner wall surface 210. When the top cap 300 caps the sidewall 200, the top wall surface 220 contacts with the lower surface 310. A portion of the ground connecting structure 700 is disposed on the inner wall surface 210 and contacts with the main ground structure 400 on the base 100, and another portion of the ground connecting structure 700 is disposed on the top wall surface 220 and contacts with the parasitic ground structure 600 on the top cap 300. Therefore, the main ground structure 400 and the parasitic ground structure 600 can be electrically connected, thereby increasing the ground area.

In some embodiments, as shown, in FIG. 3, the parasitic ground structure 600 includes a first extending portion 610, a second extending portion 620 and a ground portion 630. One end of the ground connecting structure 700 is connected to the main ground structure 400 (See FIG. 2), and another end of the ground connecting structure 700 is connected to the ground portion 600. The ground portion 630 is connected between the first extending portion 610 and the second extending portion 620. An electrical length of the first extending portion 610 is greater than an electrical length of the second extending portion 620. Therefore, the first extending portion 610 can generate a relatively low-frequency resonant band, and the second extending portion 620 can generate a relatively high-frequency resonant band.

Figure 4:
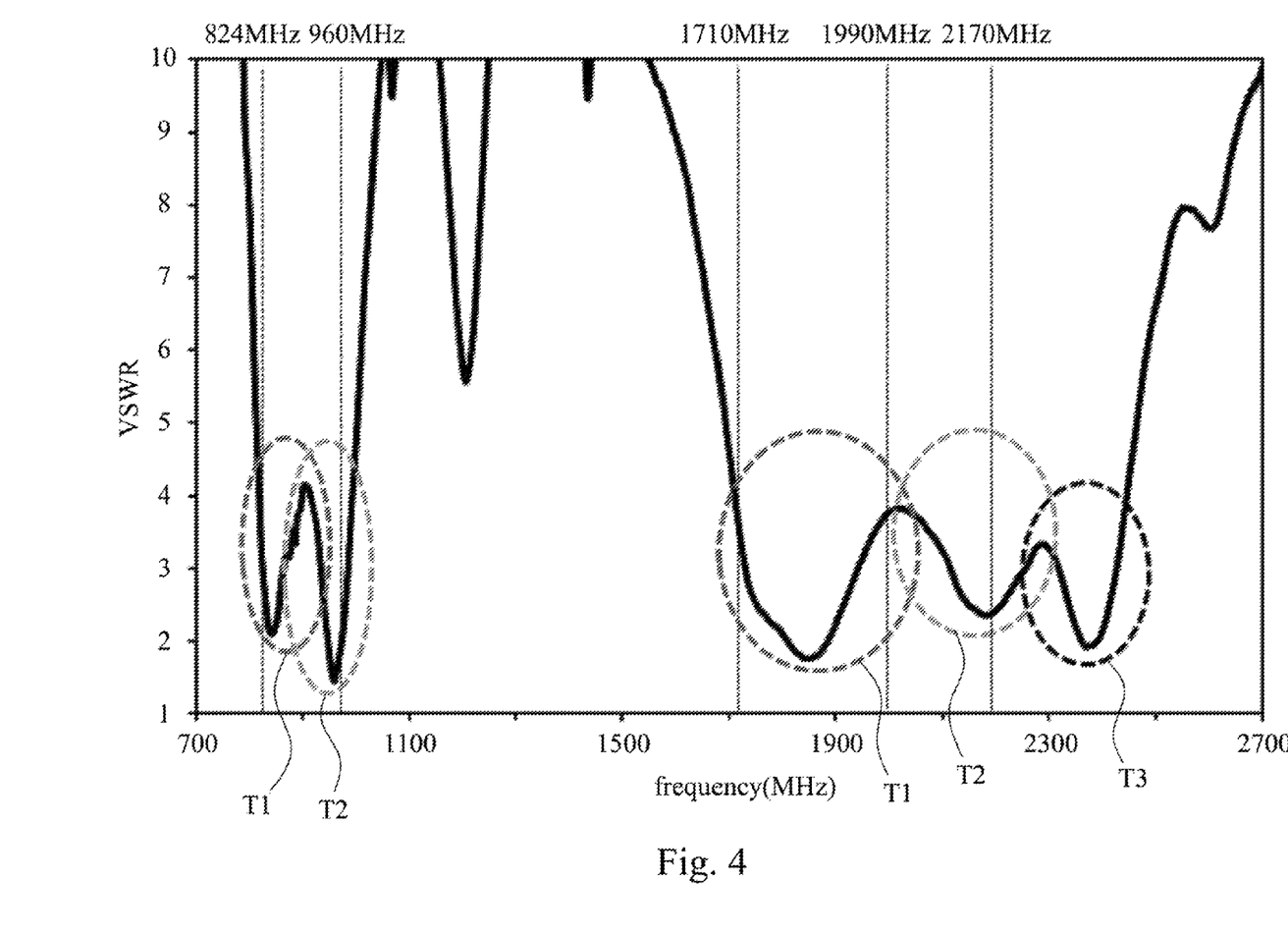
FIG. 4 is a graph of voltage standing-wave ratio (VSWR) versus frequency of the wireless communication apparatus.

The first extending portion 610 and the main ground structure 400 can generate the first resonant mode with the first radiating portion 510 in a manner of capacitive coupling. The first extending portion 610 and the main ground structure 400 can generate the second resonant mode with the second radiating portion 520 in a manner of capacitive coupling. Further, the second extending portion 620 can generate a third resonant mode. In particular, reference can be made to FIG. 4, which is a graph of voltage standing-wave ratio (VSWR) versus frequency of the wireless communication apparatus 10. As shown in FIG. 4, an electrical path formed by the main ground structure 400, the ground connecting structure 700, the ground portion 630 and the first extending portion 610 can be capacitively coupled with an electrical path formed by the signal feeding portion 530 and the first radiating portion 510, so as to generate the first resonant mode T1. A baseband of the first resonant mode T1 covers the GSM 850 frequency band, and the double frequency band of the baseband of the first resonant mode T1 covers the DCS 1800 frequency band and the PCS 1900 frequency band. The electrical path formed by the main ground structure 400, the ground connecting structure 700, the ground portion 630 and the first extending portion 610 can be capacitively coupled with an electrical path formed by the signal feeding portion 530 and the second radiating portion 520, so as to generate the second resonant mode T2. A baseband of the second resonant mode T2 covers the EGSM 900 frequency band, and the double frequency band of the baseband of the second resonant mode T2 covers the WCDMA B1 (2100 MHz) frequency band. An electrical path formed by the ground portion 630 and the second extending portion 620 can be capacitively coupled with the electrical path formed by the signal feeding portion 530 and the first radiating portion 510, so as to generate the third resonant mode T3. A baseband of the third resonant mode T3 covers 2300 MHz to 2400 MHz.

As shown in FIG. 4, the wireless communication apparatus 10 according to this embodiment can transreceive signals in frequency bands of GSM 850, EGSM 900, DCS 1800, PCS 1900, WCDMA B1, thereby effectively satisfying requirements of these frequency bands by such a small-sized wireless communication apparatus 10. It is noted that the high frequency bands of the first resonant mode T1 and the second resonant mode T2 are not required for covering 2300 MHz to 2400 MHz since the third resonant mode T3 generated by the second extending portion 620 can cover 2300 MHz to 2400 MHz. Therefore, the designer can lower the high frequency bands of the first resonant mode T1 and the second resonant mode T2 by adjusting the electrical length of the first extending portion 610, such that the high frequency bands of the first resonant mode T1 and the second resonant mode T2 can cover 1710 MHz to 2100 MHz, so as to cover the frequency bands of DCS 1800, PCS 1900 and WCDMA B1.

In some embodiments, as shown in FIG. 2, the antenna 500 and the main ground structure 400 are spaced apart and define a minimal interval G1 therebetween. In other words, the minimal interval G1 is the interval where the distance from the antenna 500 to the main ground structure 400 is shortest. The minimal interval G1 is about 3 mm. Such a size of the minimal interval G1 may benefit the main ground structure 400, the antenna 500 and the parasitic ground structure 600 to generate the foregoing first, second and third resonant modes T1, T2 and T3.

In some embodiments as shown in FIGS. 2 and 3, when the top cap 300 caps the sidewall 200, the antenna 500 and the lower surface 310 of the top cap 300 are spaced apart and define a minimal interval G2 therebetween. In other words, the minimal interval G2 is the interval where the distance from the antenna 500 to the lower surface 310 is shortest. The minimal interval G2 is about 1.5 mm. Such a size of the minimal interval G2 may benefit the main ground structure 400, the antenna 500 and the parasitic ground structure 600 to generate the foregoing first, second and third resonant modes T1, T2 and T3.

In some embodiments, as shown in FIG. 2, the ground connecting structure 700 and the antenna 500 are spaced apart and define a minimal interval G3 therebetween. In particular, the first radiating portion 510 is closer to the ground connecting structure 700 than the second radiating portion 520 being, and the first end 511 of the first radiating portion 510 and the ground connecting structure 700 define the minimal interval G3 therebetween. In other words, the minimal interval G3 is the interval where the distance from the first end 511 to the ground connecting structure 700 is shortest, which can be used to adjust the high frequency band of the first resonant mode T1. The minimal interval G3 is about 1.5 mm. Such a size of the minimal interval G3 may benefit the main ground structure 400, the antenna 500 and the parasitic ground structure 600 to generate the foregoing first, second and third resonant modes T1, T2 and T3.

In some embodiments, as shown in FIG. 3, the top cap 300 has an outer lateral surface 320 and an inner lateral surface 330 respectively adjoining with opposite sides of the lower surface 310. The first extending portion 610 and the outer lateral surface 320 are spaced apart and define a minimal interval G4 therebetween, which can be used to increase the distance from the first extending portion 610 to the inner wall surface 210 (See FIG. 2), thereby preventing the first extending portion 610 from influencing other antenna on the inner wall surface 210. Preferably, the minimal interval G4 is about 3 mm.

In some embodiments, as shown in FIG. 3, the first extending portion 610, the ground portion 630 and the second extending portion 620 substantially form an annular pattern. The annular pattern has an opening G5. The opening G5 separates the first extending portion 610 and the second extending portion 620, so as to benefit the ground portion 630 and the first extending portion 610 to form an electrical path, and to benefit the ground 630 and the second extending portion 620 to form another electrical path. The minimal width of the opening G5 can be used to adjust the low frequency band of the first resonant mode T1 and the low frequency band of the second resonant mode T2. In particular, the shorter the minimal width of the opening G5 is, the longer the electrical path of the first extending portion 610 is, so that the electrical length is greater, which may benefit to generate a low frequency band by resonance, such as the GSM 850 frequency band and the EGSM 900 frequency band. Preferably, the minimal width of the opening G5 is about 1.5 mm, which may benefit to generate the low frequency band of the first resonant mode T1 and the low frequency band of the second resonant mode T2.

In some embodiments, as shown in FIG. 3, the top cap 300 has an opening O. The first extending portion 610 extends along a path surrounding the opening O. In particular, the top cap 300 has a lengthwise direction L and a widthwise direction W substantially perpendicular to each other. The first extending portion 610 includes a first sub-portion 611, a second sub-portion 612, a third sub-portion 613 and a fourth sub-portion 614. The first sub-portion 611 extends from the ground portion 630 along the lengthwise direction L away from the second extending portion 620. The second sub-portion 612 counterclockwise turns about 90 degrees from an end of the first sub-portion 611 and extends along the widthwise direction W. The third sub-portion 613 counterclockwise turns about 90 degrees from an end of the second sub-portion 612 and extends along the lengthwise direction L. The fourth sub-portion 614 counterclockwise turns about 90 degrees from an end of the third sub-portion 613 and extends along the widthwise direction W. The first sub-portion 611, the second sub-portion 612, the third sub-portion 613 and the fourth sub-portion 614 formed by such a manner can effectively increase the electrical length of the first extending portion 610, which may benefit to generate the first resonant mode T1 and the second resonant mode T2.

In some embodiments, as shown in FIG. 3, the second extending portion 620 has a first electrically conductive sheet 621, a second electrically conductive sheet 622, a connecting electrically conductive sheet 623 and a slit S. The first electrically conductive sheet 621 is connected to the ground portion 630. The connecting electrically conductive sheet 623 connects the first electrically conductive sheet 621 and the second electrically conductive sheet 622. The slit S is located between the first electrically conductive sheet 621 and the second electrically conductive sheet 622. The first electrically conductive sheet 621 is closer to the inner lateral surface 330 of the top cap 300 than the second electrically conductive sheet 622 being. By such a configuration, the second extending portion 620 can form an electrical path that is similar to a U-shaped path, so as to generate the third resonant mode T3 within a limited area.

Figure 5:
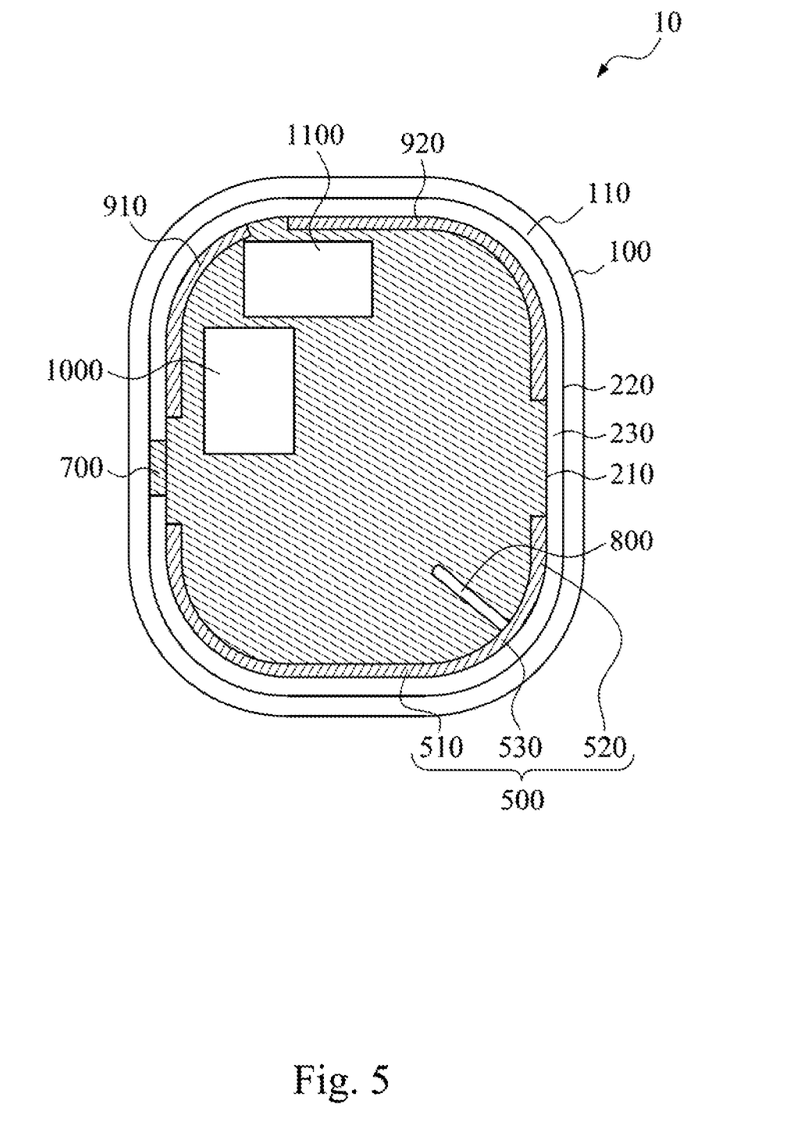
FIG. 5 is a top view of an interior of the wireless communication apparatus in accordance with one embodiment of the present disclosure.

FIG. 5 is a top view of an interior of the wireless communication apparatus 10 in accordance with one embodiment of the present disclosure. As shown in FIG. 5, in some embodiments, the wireless communication apparatus 10 further includes a Bluetooth® antenna 910 and a GPS antenna 920. The Bluetooth® antenna 910 and the GPS antenna 920 are both disposed on the inner wall surface 210 of the side all 200. The antenna 500, the Bluetooth® antenna 910 and the GPS antenna 920 are spaced apart from each other. It is noted that, as shown in FIG. 3, the first extending portion 610 and the outer lateral surface 320 of the top cap 300 are spaced apart and define a minimal interval G4, which may be used to increase the distance from the first extending portion 610 to the inner wall surface 210, so that the distance from the first extending portion 610 to the Bluetooth® antenna 910 and the distance from the first extending portion 610 to the GPS antenna 920 can be increased, thereby preventing the first extending portion 610 from influencing the Bluetooth® antenna 910 and the GPS antenna 920 on the inner wall surface 210.

The following table shows the antenna efficiency and antenna gain of the wireless communication apparatus 10 shown in FIG. 2 and FIG. 3.

| frequency(MHz) | efficiency(%) | gain(dB) |
| --- | --- | --- |
| 824 | 23.24 | −6.34 |
| 836 | 22.64 | −6.45 |
| 849 | 21.52 | −6.67 |
| 862 | 21.58 | −6.66 |
| 869 | 22.12 | −6.55 |
| 880 | 22.63 | −6.45 |
| 894 | 21.52 | −6.67 |
| 900 | 19.99 | −6.99 |
| 915 | 17.27 | −7.63 |
| 925 | 15.60 | −8.07 |
| 940 | 14.87 | −8.28 |
| 960 | 13.28 | −8.77 |
| 1710 | 30.42 | −5.17 |
| 1730 | 35.75 | −4.47 |
| 1750 | 39.98 | −3.98 |
| 1770 | 44.29 | −3.54 |
| 1785 | 45.22 | −3.45 |
| 1805 | 48.02 | −3.19 |
| 1840 | 48.44 | −3.15 |
| 1850 | 45.33 | −3.44 |
| 1880 | 36.19 | −4.41 |
| 1910 | 31.15 | −5.07 |
| 1920 | 30.05 | −5.22 |
| 1930 | 29.13 | −5.36 |
| 1950 | 26.48 | −5.77 |
| 1960 | 26.04 | −5.84 |

-continued

| frequency(MHz) | efficiency(%) | gain(dB) |
| --- | --- | --- |
| 1980 | 23.82 | −6.23 |
| 1995 | 11.89 | −6.40 |
| 2110 | 36.71 | −4.35 |
| 2140 | 25.50 | −5.93 |
| 2170 | 18.61 | −7.30 |

As shown in the foregoing table, the antenna efficiency in the low frequency band (824 MHz to 960 MHz) ranges from 13.28% to 23.24%, and the antenna efficiency in the high frequency band (1710 MHz to 2170 MHz) ranges from 11.89% to 48.44%. Therefore, the foregoing wireless communication apparatus can effectively satisfy requirements of GSM 850, EGSM 900, DCS 1800, PCS 1900 and WCDMA B1 bands.

In some embodiments, as shown in FIG. 2, the wireless communication apparatus further includes a SIM card slot 1000 and a speaker 1100, and both of them are disposed on the main ground structure 400 and surrounded by the inner wall surface 210 of the sidewall 200. The SIM card slot 1000 can be inserted by a SIM card, so as to allow the wireless communication. The speaker 1100 can make sounds to the user.

In some embodiments, as shown in FIG. 1, the wireless communication apparatus includes a sealing body 1200. The sealing body 1200 is located in the opening O of the top cap 300, so as to shade the internal elements inside the wireless communication apparatus. In some embodiments, the sealing body 1200 can be a display panel to show an image to the user. Moreover, the display panel can be a touch display panel, so that the user can control the wireless communication apparatus in a touch-control manner.

Figure 6:
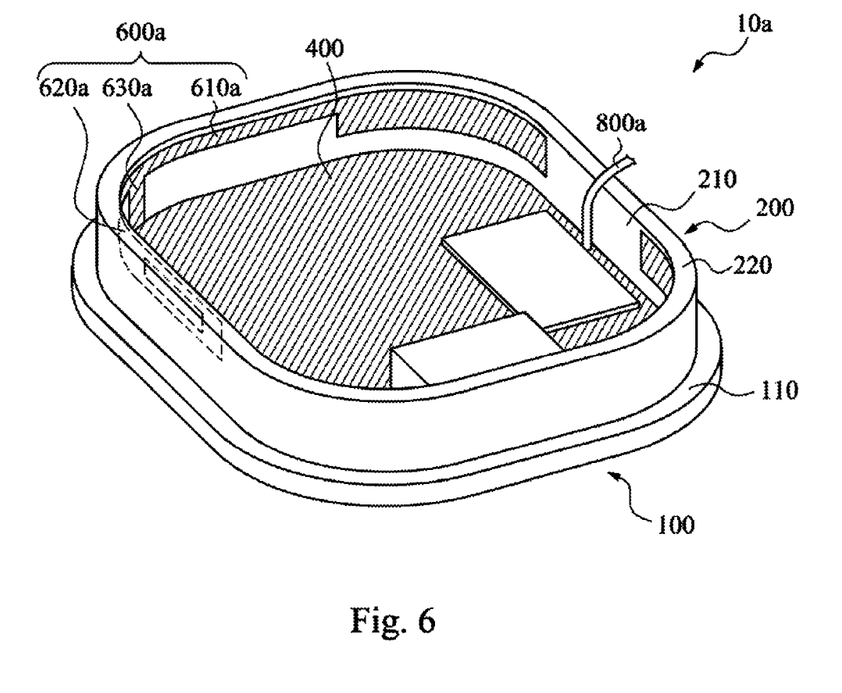
FIG. 6 is a perspective view of an interior of a wireless communication apparatus in accordance with another embodiment of the present disclosure.
Figure 7:
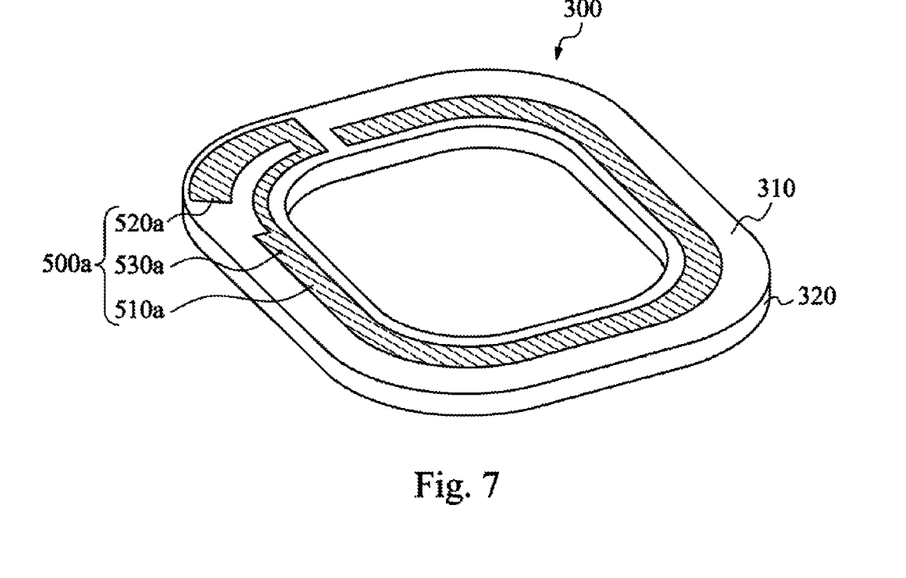
FIG. 7 is a perspective view of the top cap of the wireless communication apparatus.

FIG. 6 is a perspective view of an interior of a wireless communication apparatus 10a in accordance with another embodiment of the present disclosure. FIG. 7 is a perspective view of the top cap 300 of the wireless communication apparatus 10a. The main difference between the wireless communication apparatus 10a and the foregoing wireless communication apparatus 10 is that the spatial relation between the antenna 500a and the parasitic ground structure 600a is reverse to the spatial relation between the antenna 500 and the parasitic ground structure 600. More particularly, the parasitic ground structure 600a electrically connecting to the main ground structure 400 is disposed on the inner wall surface 210 of the sidewall 200, not on the top cap 300; on the contrary, the antenna 500a is disposed on the lower surface 310 of the top cap 300, not on the sidewall 200. The parasitic ground structure 600a and the main ground structure 400 can cooperatively resonate with the antenna 500a on the top cap 300.

In particular, the parasitic ground structure 600a and the main ground structure 400 are connected at an interface between the top surface 110 and the inner wall surface 210, so that the parasitic ground structure 600a can be electrically connected to the main ground structure 400, thereby cooperatively serving as the ground of the whole apparatus. More particularly, an end of the ground portion 630a of the parasitic ground structure 600a is located on the interface between the top surface 110 and the inner wall surface 210 to contact with the main ground structure 400. The signal transmission wire 800a is disposed on the base 100 and connected to the antenna 500a on the top cap 300. More particularly, the positive terminal of the signal transmission wire 800a is located on the top cap 300 and connected to the signal feeding portion 530a of the antenna 500a. The negative terminal of the signal transmission wire 800a is located on the base 100 and connected to the main ground structure 400, so that the parasitic ground structure 600a electrically connecting to the main ground structure 400 can also be electrically connected to the negative terminal of the signal transmission wire 800a, so as to resonate with the antenna 500a on the top cap 300.

Specific structures of the first extending portion 610a and the second extending portion 620a of the parasitic ground structure 600a shown in FIG. 6 are respectively similar to the first radiating portion 510 and the second radiating portion 520 of the antenna 500 shown in FIG. 2, and they are therefore not described repeatedly. Specific structures of the first radiating portion 510a and the second radiating portion 520a are respectively similar to the first extending portion 610 and the second portion 620, and they are therefore not described repeatedly.

It is understood that the description "A parameter is about a value" in this context generally means within some range of the given value. For example, "the minimal interval G1 is about 3 mm" allows the minimal interval G1 to satisfy: 3 mm×90%≤G1≤3 mm×110%, and preferably allows the minimal interval G1 to satisfy: 3 mm×95%≤G1≤3 mm×105%.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A wireless communication apparatus, comprising:
a base having a top surface;
a sidewall forming a closed-loop interface with the to surface of the base, the sidewall having an inner wall surface;
a top cap capping the sidewall, the top cap having a lower surface facing toward the top surface;
a main ground structure disposed on the top surface of the base and surrounded by the sidewall;
an antenna disposed on the inner wall surface of the sidewall; and
a parasitic ground structure disposed on the lower surface of the top cap and electrically connected to the main ground structure, wherein the parasitic ground structure and the main ground structure are cooperatively configured to resonate with the antenna.

2. The wireless communication apparatus of claim 1, wherein the antenna comprises a first radiating portion, a second radiating portion and a signal feeding portion, wherein the signal feeding portion is connected between the first radiating portion and the second radiating portion, wherein the parasitic ground structure and the main ground structure are cooperatively configured to generate a first resonant mode with the first radiating portion and to generate a second resonant mode with the second radiating portion, wherein the first resonant mode and the second resonant mode have different frequency bands.

3. The wireless communication apparatus of claim 2, further comprising a ground connecting structure disposed on, wherein one end of the ground connecting structure is connected to the main ground structure, and the parasitic ground structure comprises a first extending portion, a second extending portion and a ground portion, wherein another end of the ground connecting structure is connected to the ground portion, wherein the ground portion is connected between the first extending portion and the second extending portion, wherein an electrical length of the first extending portion is greater than an electrical length of the second extending portion, wherein the first extending portion and the main ground structure are configured to generate the first resonant mode with the first radiating portion in a manner of capacitive coupling and to generate the second resonant mode with the second radiating portion in a manner of capacitive coupling.

4. The wireless communication apparatus of claim 3, wherein the first extending portion, the ground portion and the second extending portion substantially form an annular pattern, wherein the annular pattern has an opening that separates the first extending portion and the second extending portion.

5. The wireless communication apparatus of claim 4, wherein a minimal width of the opening is about 1.5 mm.

6. The wireless communication apparatus of claim 3, wherein the second extending portion has a first electrically conductive sheet, a connecting electrically conductive sheet, a second electrically conductive sheet and a slit, wherein the first electrically conductive sheet is connected to the ground portion, the connecting electrically conductive sheet connects the first electrically conductive sheet and the second electrically conductive sheet, the slit is located between the first electrically conductive sheet and the second electrically conductive sheet, the top cap has an inner lateral surface and an outer lateral surface respectively adjoining with opposite sides of the lower surface, wherein the first electrically conductive sheet is closer to the inner lateral surface of the top cap than the second electrically conductive sheet being.

7. The wireless communication apparatus of claim 3, wherein the ground connecting structure and the antenna are spaced apart and define a minimal interval therebetween, wherein the minimal interval is about 1.5 mm.

8. The wireless communication apparatus of claim 3, wherein the top cap has an outer lateral surface adjoining with the lower surface, wherein the first extending portion and the outer surface are spaced apart and define a minimal interval therebetween, wherein the minimal interval is about 3 mm.

9. The wireless communication apparatus of claim 1, wherein the antenna and the lower surface of the top cap are spaced apart and define a minimal interval therebetween, wherein the minimal interval is about 1.5 mm.

10. The wireless communication apparatus of claim 1, wherein the antenna and the main ground structure are spaced apart and define a minimal interval therebetween, wherein the minimal interval is about 3 mm.

11. A wireless communication apparatus, comprising:
a base having a top surface;
a sidewall forming a closed-loop interface with the top surface of the base, the sidewall having an inner wall surface;
a top cap capping the sidewall, the top cap having a lower surface facing toward the top surface;
a main ground structure disposed on the top surface of the base and surrounded by the sidewall;
a parasitic ground structure disposed on the inner wall surface of the sidewall and electrically connected to the main ground structure; and an antenna disposed on the lower surface of the top cap, wherein the parasitic ground structure and the main ground structure are cooperatively configured to resonate with the antenna.

12. The wireless communication apparatus of claim 11, further comprising a signal transmission wire disposed on the base and connected to the antenna located on the top cap.

13. The wireless communication apparatus of claim 11, wherein the parasitic ground structure and the main ground structure are connected at an interface between the top surface of the base and the inner wall surface of the sidewall.

* * * * *